United States Patent
Paul et al.

(10) Patent No.: US 12,517,993 B2
(45) Date of Patent: Jan. 6, 2026

(54) SEAMLESS AND CONTINUOUS AUTHENTICATION OF PATIENTS

(71) Applicant: Dexcom, Inc., San Diego, CA (US)

(72) Inventors: Nathanael Richard Paul, Adams, TN (US); Jorge R. Barreras, Dania Beach, FL (US)

(73) Assignee: Dexcom, Inc., San Diego, CA (US)

( * ) Notice: Subject to any disclaimer, the term of this patent is extended or adjusted under 35 U.S.C. 154(b) by 147 days.

(21) Appl. No.: 18/485,775

(22) Filed: Oct. 12, 2023

(65) Prior Publication Data

US 2024/0169045 A1   May 23, 2024

Related U.S. Application Data

(60) Provisional application No. 63/384,732, filed on Nov. 22, 2022.

(51) Int. Cl.
*G06F 21/32* (2013.01)
*G16H 40/67* (2018.01)

(52) U.S. Cl.
CPC .............. *G06F 21/32* (2013.01); *G16H 40/67* (2018.01)

(58) Field of Classification Search
CPC .............. G06F 21/32; G06F 2221/2111; G06F 21/316; H04L 63/0861; H04W 4/38; H04W 12/065
See application file for complete search history.

(56) References Cited

U.S. PATENT DOCUMENTS

| | | | |
|---|---|---|---|
| 9,558,336 B2* | 1/2017 | Lee | A61B 5/349 |
| 9,892,576 B2* | 2/2018 | Kursun | G06Q 20/40145 |
| 2015/0035643 A1* | 2/2015 | Kursun | G07C 9/32 340/5.82 |
| 2015/0135310 A1 | 5/2015 | Lee | |
| 2017/0140134 A1* | 5/2017 | Brough | A61B 5/002 |
| 2023/0148327 A1* | 5/2023 | Smith-Creasey | G06F 21/32 713/186 |

FOREIGN PATENT DOCUMENTS

WO   2021180443 A1   9/2021

OTHER PUBLICATIONS

International Search Report and Written Opinion for Application No. PCT/US2023/076717 mailed Feb. 9, 2024, 16 pages.

* cited by examiner

*Primary Examiner* — Beemnet W Dada
(74) *Attorney, Agent, or Firm* — Patterson + Sheridan, LLP

(57) ABSTRACT

Systems, techniques, and devices for performing passive continuous authentication of a user of display device are disclosed. In certain embodiments, the techniques include obtaining first information including at least one of (i) non-analyte sensor data from one or more sensors of a display device or (ii) analyte sensor data from an analyte sensor system. The techniques further include authenticating an identity of the user of the display device at a first point in time and based on the first information. The techniques further include allowing the user of the display device to access a medical device software running on the display device without prompting the user for authentication information, upon determining that the authentication at the first point in time is successful.

36 Claims, 6 Drawing Sheets

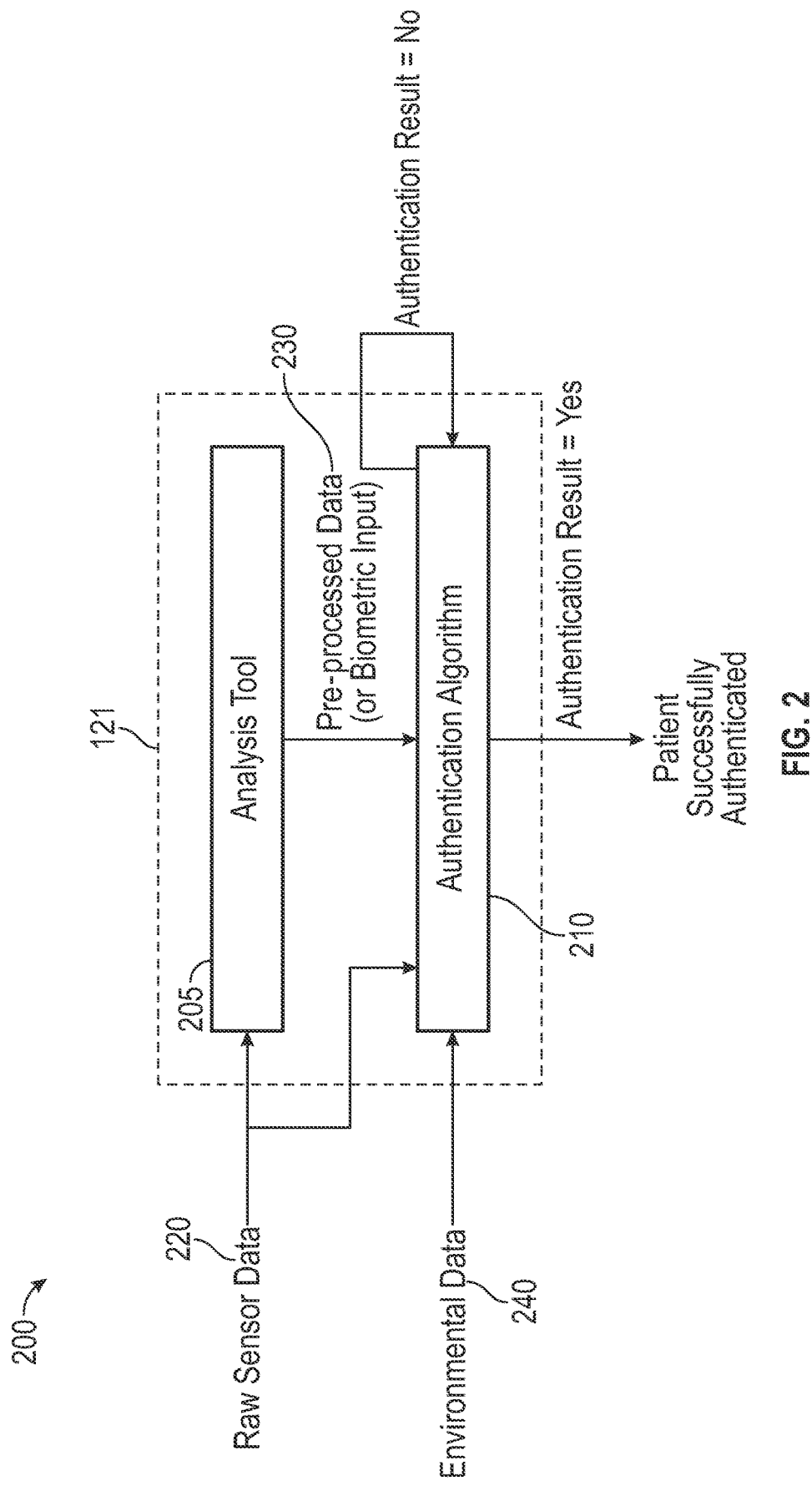

SEAMLESS AND CONTINUOUS AUTHENTICATION OF PATIENTS

CROSS-REFERENCE TO RELATED APPLICATION

This application claims the benefit of U.S. Application Ser. No. 63/384,732 filed Nov. 22, 2022, and hereby incorporated by reference in its entirety for all purposes.

BACKGROUND

Diabetes is a metabolic condition relating to the production or use of insulin by the body. Insulin is a hormone that allows the body to use glucose for energy, or store glucose as fat.

Diabetes mellitus is a disorder in which the pancreas cannot create sufficient insulin (Type 1 or insulin dependent) and/or in which insulin is not effective (Type 2 or non-insulin dependent). In the diabetic state, the victim suffers from high blood sugar, which causes an array of physiological derangements (kidney failure, skin ulcers, or bleeding into the vitreous of the eye) associated with the deterioration of small blood vessels. A hypoglycemic reaction (low blood sugar) may be induced by an inadvertent overdose of insulin, or after a normal dose of insulin or glucose-lowering agent accompanied by extraordinary exercise or insufficient food intake.

Conventionally, a diabetic patient carries a self-monitoring blood glucose (SMBG) monitor, which may require uncomfortable finger pricking methods. Due to the lack of comfort and convenience, a diabetic will normally only measure his or her glucose level two to four times per day. Unfortunately, these time intervals are spread so far apart that the diabetic will likely be alerted to a hyperglycemic or hypoglycemic condition too late, sometimes incurring dangerous side effects as a result. In fact, it is unlikely that a diabetic will take a timely SMBG value, and further the diabetic will not know if his blood glucose value is going up (higher) or down (lower), due to limitations of conventional methods.

Consequently, a variety of non-invasive, transdermal (e.g., transcutaneous) and/or implantable sensors are being developed for continuously detecting and/or quantifying blood glucose values. Generally, in a diabetes management system, a transmitter associated with the sensor wirelessly transmits raw or minimally processed data for subsequent display and/or analysis at one or more display devices, which can include a mobile device, a server, or any other type of communication devices. A display device, such as a mobile device, may then utilize a trusted software application (e.g., approved and/or provided by the manufacturer of the sensor), which takes the raw or minimally processed data and provides the user with information about the user's blood glucose levels. Because diabetes management systems using such implantable sensors can provide more up-to-date information to users, they may reduce the risk of a user failing to regulate the user's blood glucose levels.

This background is provided to introduce a brief context for the summary and detailed description that follow. This background is not intended to be an aid in determining the scope of the claimed subject matter nor be viewed as limiting the claimed subject matter to implementations that solve any or all of the disadvantages or problems presented above.

SUMMARY

Certain embodiments provide a computer-implemented method for performing passive continuous authentication of a user of a display device. The computer-implemented method includes obtaining first information including at least one of (i) non-analyte sensor data from one or more sensors of a display device or (ii) analyte sensor data from an analyte sensor system associated with the display device. The computer-implemented method also includes authenticating an identity of the user of the display device at a first point in time and based on the first information. The computer-implemented method further includes determining that prompting the user for authentication information is not required when the authentication at the first point in time is successful. The computer-implemented method further includes, in response to determining that prompting the user for the authentication information is not required, allowing the user of the display device to access a medical device software running on the display device without prompting the user for the authentication information.

Certain embodiments provide a non-transitory computer-readable medium. The non-transitory computer-readable medium stores computer-executable instructions, which when executed by one or more processors of a display device, performs an operation for passive continuous authentication of a user of the display device. The operation includes obtaining first information comprising at least one of (i) non-analyte sensor data from one or more sensors of the display device or (ii) analyte sensor data from an analyte sensor system associated with the display device. The operation also includes authenticating an identity of the user of the display device at a first point in time and based on the first information. The operation further includes determining that prompting the user for authentication information is not required when the authentication at the first point in time is successful. The operation further includes, in response to determining that prompting the user for the authentication information is not required, allowing the user of the display device to access a medical device software running on the display device without prompting the user for the authentication information.

Certain embodiments provide a display device. The display device includes (i) a transceiver configured receive analyte sensor data from an analyte sensor system; (ii) one or more sensors configured to generate non-analyte sensor data; (iii) one or more memories collectively storing computer-executable instructions; and (iv) one or more processors coupled to the transceiver, the one or more sensors, and the one or more memories. The one or more processors are collectively configured to execute the computer-executable instructions to cause the display device to perform an operation. The operation includes obtaining first information including at least one of (i) the non-analyte sensor data from the one or more sensors or (ii) the analyte sensor data from the transceiver. The operation also includes authenticating an identity of a user of the display device at a first point in time and based on the first information. The operation also includes determining that prompting the user for authentication information is not required when the authentication at the first point in time is successful. The operation further includes, in response to determining that prompting the user for the authentication information is not required, allowing the user of the display device to access a medical device software running on the display device without prompting the user for the authentication information.

Certain embodiments provide a system. The system includes an analyte sensor system and a display device. The analyte sensor system is configured to transmit analyte sensor data. The display device is configured to obtain first information comprising at least one of (i) non-analyte sensor data from one or more sensors of the display device or (ii) the analyte sensor data transmitted from the analyte sensor system. The display device is also configured to authenticate an identity of a user of the display device at a first point in time and based on the first information. The display device is also configured to determine that prompting the user for authentication information is not required when the authentication at the first point in time is successful. The display device is further configured to, in response to determining that prompting the user for authentication is not required, allow the user of the display device to access a medical device software running on the display device without prompting the user for the authentication information.

BRIEF DESCRIPTION OF THE DRAWINGS

FIG. 2 illustrates an example workflow for passive continuous authentication of a user, according to certain embodiments disclosed herein.

DETAILED DESCRIPTION OF CERTAIN INVENTIVE EMBODIMENTS

Figure 1A:
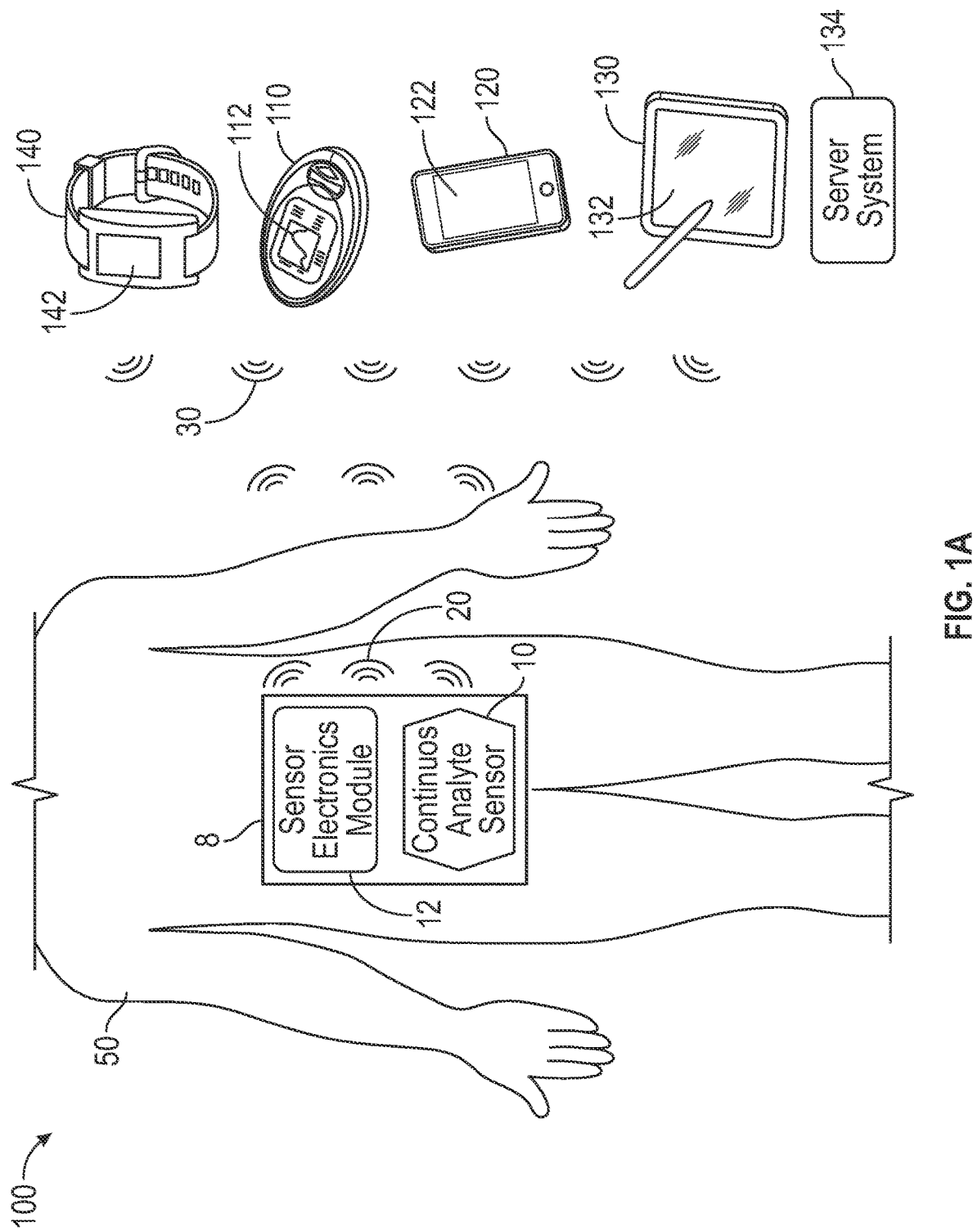
FIG. 1A illustrates an example diabetes management system, according to certain embodiments disclosed herein.

As described above, usage of various display devices by patients to manage various health conditions has become prevalent. However, unfortunately, as patients increasingly use display devices and dedicated medical display devices to manage medical conditions, such as diabetes, many of these devices are increasingly susceptible to being compromised by malicious actors. Such malicious actors, for example, generally attempt to use display devices to interfere with patient care, among other things. Consequently, many medical device software applications (hereinafter referred to as medical device software) executed by display devices will periodically authenticate a user by requiring the user to periodically and actively interact with the display device. For example, such medical device software may periodically prompt the user to manually enter user credentials (e.g., username and/or password) or biometric input (e.g., fingerprint, facial scan, etc.) to verify that the correct user (e.g., registered user), as opposed to some other user, is interacting with the medical device software. Although authenticating a user based on periodic active interaction with the display device can help to mitigate some of the safety, integrity, privacy, and availability issues associated with using medical device software, performing authentication that involves periodic active interactions has certain shortcomings. Accordingly, there is a need for improvements to techniques for authenticating a user of a display device.

Accordingly, certain embodiments described herein relate to a number of techniques for passively authenticating a user (e.g., authenticating the user's identity) over time to allow the user to use (or continue to use) a medical device software (e.g., diabetes management software) running on the user's display device (e.g., mobile device or dedicated medical display device). Certain embodiments may reduce issues associated with performing authentication based on periodic active interaction with the mobile device. For example, performing authentication based on periodic active interaction with the mobile device can be significantly burdensome on the user and, in turn, may cause the user to stop (or reduce) monitoring the user's medical condition. For instance, requiring a patient with diabetes to periodically (e.g., every 5 minutes) authenticate in order to access the patient's glucose information on the patient's mobile device may cause the patient to stop monitoring their glucose information, which can negatively impact the patient's health.

Rather than requiring a user (e.g., patient) to periodically and actively interact with the user's mobile device for authentication, certain embodiments described herein provide techniques for authenticating a user in a manner that does not involve active (or explicit) user interaction with a display device. That is, in certain embodiments, medical device software running on a user's display device may not (at least initially) explicitly ask the user to input a set of user credentials (e.g., username, password, or a combination thereof) or biometric data (e.g., fingerprint, facial scan, etc.) via their display device. In certain embodiments, a technique is provided herein that may use one or more (or a combination of) different types of data to perform passive continuous authentication of the user. Such different types of data can include, for example, sensor data (e.g., acceleration, heart rate, glucose reading, etc.), pre-processed data (e.g., patient gait, eating pattern, etc.), environmental information (e.g., user location, time of day, temperature, speech, surrounding audio, wireless signals, etc.), or a combination thereof. Using one or more (or a combination of) different types of data to perform passive continuous authentication of a user in this manner allows the medical device software to verify that the correct user (e.g., registered user) is accessing the medical device software (as opposed to some other user) without requiring the user to actively interact with the display device.

Advantageously, performing passive continuous authentication using the techniques described herein can significantly reduce the burden on the user to have to periodically and actively interact with their display device in order to access the medical device software running on the display device. Reducing this burden on the user can significantly enhance a user's experience with using medical device software to manage the user's health, while also mitigating some of the safety, integrity, privacy, and availability issues associated with using medical device software that does not perform authentication. Additionally, performing passive continuous authentication using the techniques described herein can reduce consumption of resources (e.g., compute resources, memory resources, etc.) by the display device, since the display device can avoid periodically prompting the user to actively interact with the display device for authentication. Reducing consumption of resources, in turn, reduces battery consumption, which is critical to ensuring that the display device is operational and can be used to provide decision support to the user.

The techniques described herein for performing passive continuous authentication of a user are described more fully herein with respect to FIGS. 1A-1B and 2-5 below. As used herein, authenticating a user (also referred to as user authentication) may refer to authenticating a user's identity. For example, authenticating the user's identity may include verifying that it is in fact the registered user of the display device (and not another person) that is using the medical device software on the user's display device. Note that although certain embodiments herein are described with respect to the management of diabetes, a glucose sensor system, and the transmission of glucose measurement between the devices, the protocols and techniques described herein are similarly applicable to any type of health management system that includes any type of analyte sensor (e.g., lactate sensor, ketone sensor, etc.).

Example Analyte Sensor System

FIG. 1A depicts a disease management system 100 ("system 100"), such as a diabetes management system, that may be used in connection with certain embodiments of the present disclosure. Certain such embodiments may involve performing passive continuous authentication of a user over time to allow the user to use (or continue to use) medical device software (e.g., diabetes management software) on the user's display device for gathering, monitoring, and/or providing information regarding analyte values present in a user's body, including for example the user's blood glucose values. System 100 depicts aspects of analyte sensor system 8 (hereinafter "SS 8") that may be communicatively coupled to display devices 110, 120, 130, and 140, and/or server system 134.

In certain embodiments, SS 8 is provided for measurement of an analyte in a host or a user. By way of an overview and an example, SS 8 may be implemented as an encapsulated microcontroller that makes sensor measurements, generates analyte data (e.g., by calculating values for continuous glucose monitoring data), and engages in wireless communications (e.g., via Bluetooth and/or other wireless protocols) to send such data to remote devices, such as display devices 110, 120, 130, 140, and/or server system 134. Paragraphs [0137]-[0140] and FIGS. 3A, 3B, and 4 of U.S. App. No. 2019/0336053 further describe an on-skin sensor assembly that, in certain embodiments, may be used in connection with SS 8. Paragraphs [0137]-[0140] and FIGS. 3A, 3B, and 4 of U.S. App. No. 2019/0336053 are incorporated herein by reference.

In certain embodiments, SS 8 includes an analyte sensor electronics module 12 and an analyte sensor 10 associated with analyte sensor electronics module 12. In certain embodiments, analyte sensor electronics module 12 includes electronic circuitry associated with measuring and processing analyte sensor data or information, including algorithms associated with processing and/or calibration of the analyte sensor data/information. Analyte sensor electronics module 12 may be physically/mechanically connected to analyte sensor 10 and can be integral with (i.e., non-releasably attached to) or releasably attachable to analyte sensor 10.

Analyte sensor electronics module 12 may also be electrically coupled to analyte sensor 10, such that the components may be electromechanically coupled to one another (e.g., (a) prior to insertion into a patient's body, or (b) during the insertion into the patient's body). Analyte sensor electronics module 12 may include hardware, firmware, and/or software that enable measurement and/or estimation of levels of the analyte in a host/user via analyte sensor 10 (e.g., which may be/include a glucose sensor). For example, analyte sensor electronics module 12 can include one or more potentiostats, a power source for providing power to analyte sensor 10, other components useful for signal processing and data storage, and a telemetry module for transmitting data from the sensor electronics module to one or more display devices. Electronics can be affixed to a printed circuit board (PCB) within SS 8, or platform or the like, and can take a variety of forms. For example, the electronics can take the form of an integrated circuit (IC), such as an Application-Specific Integrated Circuit (ASIC), a microcontroller, a processor, and/or a state machine.

Analyte sensor electronics module 12 may include sensor electronics that are configured to process sensor information, such as sensor data, and generate transformed sensor data and displayable sensor information. Examples of systems and methods for processing sensor analyte data are described in more detail herein and in U.S. Pat. Nos. 7,310,544 and 6,931,327 and U.S. Patent Publication Nos. 2005/0043598, 2007/0032706, 2007/0016381, 2008/0033254, 2005/0203360, 2005/0154271, 2005/0192557, 2006/0222566, 2007/0203966 and 2007/0208245, all of which are incorporated herein by reference in their entireties.

Analyte sensor 10 is configured to measure a concentration or level of the analyte in the host. The term analyte is further defined by paragraph of U.S. App. No. 2019/0336053. Paragraph [0117] of U.S. App. No. 2019/0336053 is incorporated herein by reference. In some embodiments, analyte sensor 10 comprises a continuous glucose sensor, such as a subcutaneous, transdermal (e.g., transcutaneous), or intravascular device. In some embodiments, analyte sensor 10 can analyze a plurality of intermittent blood samples. Analyte sensor 10 can use any method of glucose-measurement, including enzymatic, chemical, physical, electrochemical, spectrophotometric, polarimetric, calorimetric, iontophoretic, radiometric, immunochemical, and the like. Additional details relating to a continuous glucose sensor are provided in paragraphs [0072]-[0076] of U.S. application Ser. No. 13/827,577. Paragraphs [0072]-[0076] of U.S. application Ser. No. 13/827,577 are incorporated herein by reference. In certain embodiments, analyte sensor 10 may be configured to sense multiple analytes (e.g., glucose, potassium, lactate, and/or others).

With further reference to FIG. 1A, display devices 110, 120, 130, and/or 140 can be configured for displaying (and/or alarming) displayable sensor information that may be transmitted by sensor electronics module 12 (e.g., in a customized data package that is transmitted to the display devices based on their respective preferences). Each of display devices 110, 120, 130, or 140 may respectively include a display such as touchscreen display 112, 122, 132, and/or 142 for displaying sensor information and/or analyte data to a user and/or receiving inputs from the user. For example, a graphical user interface (GUI) may be presented to the user for such purposes. In certain embodiments, the display devices may include other types of user interfaces such as voice user interface instead of or in addition to a touchscreen display for communicating sensor information to the user of the display device and/or receiving user inputs. In certain embodiments, one, some, or all of display devices 110, 120, 130, 140 may be configured to display or otherwise communicate the sensor information as it is communicated from sensor electronics module 12 (e.g., in a data package that is transmitted to respective display devices), without any additional prospective processing required for calibration and/or real-time display of the sensor data.

The plurality of display devices 110, 120, 130, 140 depicted in FIG. 1A may include a custom or proprietary display device, for example, analyte display device, especially designed for displaying certain types of displayable sensor information associated with analyte data received from sensor electronics module 12 (e.g., a numerical value and/or an arrow, in certain embodiments). In certain embodiments, one of the plurality of display devices 110, 120, 130, 140 includes a smartphone, such as display device 120, based on an Android, iPhone Operating System (iOS), or another operating system configured to display a graphical representation of the continuous sensor data (e.g., including current and/or historic data). In certain embodiments, disease management system 100 further includes a medical delivery device (e.g., an insulin pump or pen). Sensor electronics module 12 may be configured to transmit sensor information and/or analyte data to the medical delivery device. The medical delivery device (not shown) may be configured to administer a certain dosage of insulin or another medicament to the user based on the sensor information and/or analyte data (e.g., which may include a recommended insulin dosage) received from the sensor electronics module 12.

Server system 134 may be used to directly or indirectly collect analyte data from SS 8 and/or the plurality of display devices, for example, to perform analytics thereon, generate universal or individualized models for analyte levels and profiles, provide services or feedback, including from individuals or systems remotely monitoring the analyte data, perform or assist SS 8 and display device 150 with identification, authentication, etc., according to the embodiments described herein. Note that, in certain embodiments, server system 134 may be representative of multiple systems or computing devices that perform the functions of server system 134 (e.g., in a distributed manner).

Figure 1B:
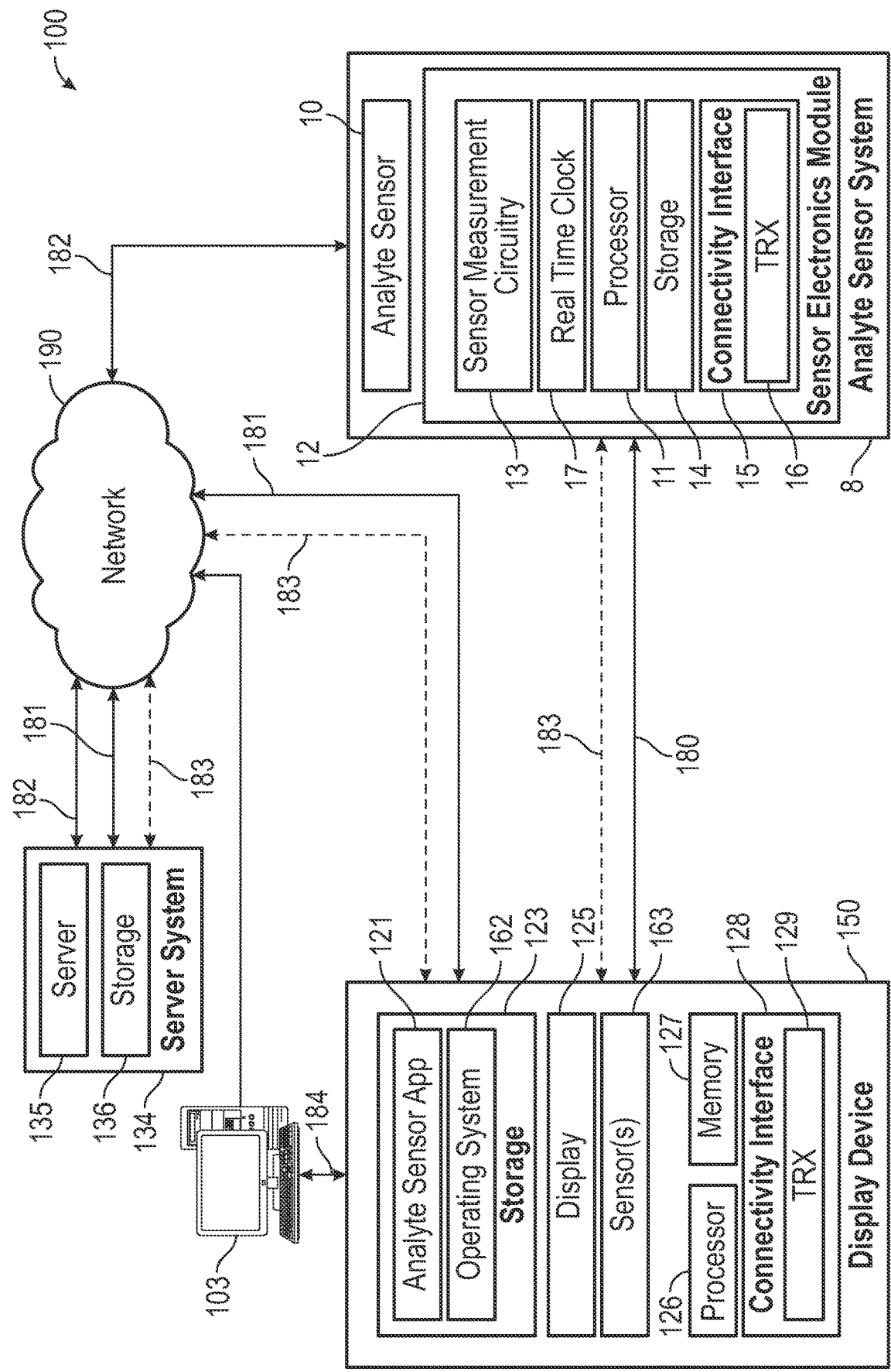
FIG. 1B illustrates the example diabetes management system of FIG. 1A in more detail, according to certain embodiments disclosed herein.

FIG. 1B illustrates a more detailed view of system 100 including a display device 150 that is communicatively coupled to SS 8. In certain embodiments, display device 150 may be any one of display devices 110, 120, 130, and 140 of FIG. 1A. The communication path between SS 8 and display device 150 is shown as communication path 180. In certain embodiments, SS 8 and display device 150 are configured to wirelessly communicate over communication path 180 using low range and/or distance wireless communication protocols. Examples of low range and/or distance wireless communication protocols include Bluetooth and Bluetooth Low Energy (BLE) protocols. In certain embodiments, other short range wireless communications may include Near Field Communications (NFC), radio frequency identification (RFID) communications, IR (infra red) communications, and optical communications, as illustrative, non-limiting examples. In certain embodiments, wireless communication protocols other than low range and/or distance wireless communication protocols may be used for communication path 180, such as WiFi Direct. Display device 150 is also configured to connect to network 190 (e.g., local area network (LAN), wide area network (WAN), the Internet, etc.). For example, display device 150 may connect to network 190 via a wired (e.g., Ethernet) or wireless (e.g., wireless LAN (WLAN), wireless WAN, cellular, Mesh network, personal area network (PAN) etc.) interface. Display device 150 is able to communicate with server system 134 through network 190. The communication path between display device 150 and server system 134 is shown as communication path 181 via network 190.

Note that, in certain embodiments, SS 8 may be able to independently (e.g., wirelessly) communicate with server system 134 through network 190. An independent communication path between SS 8 and server system 134 is shown as communication path 182. However, in certain other embodiments, SS 8 may not be configured with the necessary hardware/software to establish, for example, an independent wireless communication path with server system 134 through network 190. In such embodiments, SS 8 may communicate with server system 134 through display device 150. An indirect or pass-through communication path between SS 8 and server system 134 is shown as communication path 183.

In embodiments where display device 150 is a proprietary display device, such as display device 110 designed specifically for the communication of analyte data, display device 150 may not be configured with the necessary hardware/software for independently connecting to network 190. Instead, in certain such embodiments, display device 150 is configured to establish a wired or wireless communication path 184 (e.g., through a Universal System Bus (USB) connection) with computer device 103, which is configured to communicate with server system 134 through network 190. For example, computer device 103 may connect to network 190 via a wired (e.g., Ethernet) or wireless (e.g., WLAN, wireless WAN, cellular, etc.) interface. Note that in the embodiments described in relation to FIGS. 2-5, unless otherwise noted, display device 150 is assumed to be capable of independently communicating with server system 134 through network 190, independent of computer device 103.

System 100 additionally includes server system 134, which in turn includes server 135 that is coupled to storage 136 (e.g., one or more computer storage systems, cloud-based storage systems and/or services, etc.). In certain embodiments, server system 134 may be located or execute in a public or private cloud. In certain embodiments, server system 134 is located or executes on-premises ("on-prem"). As discussed, server system 134 is configured to receive, collect, and/or monitor information, including analyte data and related information, as well as encryption/authentication information from SS 8 and/or display device 150. Such information may include input responsive to the analyte data or input (e.g., the user's glucose measurements and other physiological/behavioral information) received in connection with an analyte monitoring or sensor application running on SS 8 or display device 150. This information may be stored in storage 136 and may be processed, such as by an analytics engine capable of performing analytics on the information. An example of an analyte sensor application that may be executable on display device 150 is analyte sensor application 121, further described below.

In certain embodiments, server system 134 at least partially directs communications between SS 8 and display device 150, for example, for facilitating authentication therebetween. Such communications include messaging (e.g., advertisement, command, or other messaging), message delivery, and analyte data. For example, in certain embodiments, server system 134 may process and exchange messages between SS 8 and display device 150 related to frequency bands, timing of transmissions, security, alarms, and so on. In certain embodiments, server system 134 may also update information stored on SS 8 and/or display device 150. In certain embodiments, server system 134 may send/receive information to/from SS 8 and/or display device 150 in real-time or sporadically. Further, in certain embodiments, server system 134 may implement cloud computing capabilities for SS 8 and/or display device 150.

FIG. 1B also illustrates the components of SS 8 in further detail. As shown, in certain embodiments, SS 8 includes analyte sensor 10 coupled to sensor electronics module 12. Sensor electronics module 12 includes sensor measurement circuitry (SMC) 13 that is coupled to analyte sensor 10 for processing and managing sensor data. SMC 13 may also be coupled to processor 11. In some embodiments, processor 11 may perform part or all of the functions of the SMC 13 for obtaining and processing sensor measurement values from analyte sensor 10. Processor 11 may also be coupled to storage 14 and real time clock (RTC) 17 for storing and tracking sensor data. In addition, processor 11 may be further coupled to a connectivity interface 15, which includes a radio unit or transceiver (TRX) 16 for sending sensor data and receiving requests and commands from an external device, such as display device 150. As used herein, the term transceiver generally refers to a device or a collection of devices that enable SS 8 to (e.g., wirelessly) transmit and receive data. SS 8 may further include storage 14 and real time clock (RTC) 17 for storing and tracking sensor data. It is contemplated that, in some embodiments, the SMC 13 may carry out all the functions of the processor 11 and vice versa.

Transceiver 16 may be configured with the necessary hardware and wireless communications protocols for enabling wireless communications between SS 8 and other devices, such as display device 150 and/or server system 134. For example, as described above, transceiver 16 may be configured with the necessary hardware and communication protocols to establish a Bluetooth or BLE connection with display device 150. As one of ordinary skill in the art appreciates, in such an example, the necessary hardware may include a Bluetooth or BLE security manager and/or other Bluetooth or BLE related hardware/software modules configured for Bluetooth or BLE communications standards. In some embodiments where SS 8 is configured to establish an independent communication path with server system 134, transceiver 16 may be configured with the necessary hardware and communication protocols (e.g., long range wireless cellular communication protocol, such as, Global System for Mobile Communications (GSM), Code-Division Multiple Access (CDMA), Long-Term Evolution (LTE), Voice over LTE (VOLTE), 3G, 4G, and 5G communication protocols, WiFi communication protocols, such as 802.11 communication protocols, etc.) for establishing a wireless connection to network 190 to connect with server system 134. As discussed elsewhere, other short range protocols, may also be used for communication between display device 150 and a SS 8 such as NFC, RFID, etc.

FIG. 1B similarly illustrates the components of display device 150 in further detail. As shown, display device 150 includes connectivity interface 128, processor 126, memory 127, one or more sensors 163, a display 125 for presenting a graphical user interface (GUI), and a storage 123. A bus (not shown here) may be used to interconnect the various elements of display device 150 and transfer data between these elements. Connectivity interface 128 includes a transceiver (TRX) 129 used for receiving sensor data from SS 8 and for sending requests, instructions, and/or data to SS 8 as well as server system 134. Transceiver 129 is coupled to other elements of display device 150 via connectivity interface 128 and/or the bus. Transceiver 129 may include multiple transceiver modules operable on different wireless standards. For example, transceiver 129 may be configured with one or more communication protocols, such as wireless communication protocol(s) for establishing a wireless communication path with network 190 and/or low range wireless communication protocol(s) (e.g., Bluetooth or BLE) for establishing a wireless communication path 180 with SS 8. Additionally, connectivity interface 128 may in some cases include additional components for controlling radio and/or wired connections, such as baseband and/or Ethernet modems, audio/video codecs, and so on. Sensor(s) 163 may include, but is not limited to, accelerometer(s), gyroscope(s), global positioning system (GPS) sensor(s), heart rate sensor(s), etc. Note that while sensor(s) 163 are shown integral to the display device, in certain embodiments, one or more of sensor(s) 163 may be standalone sensors (e.g., separate from the display device 150).

In some embodiments, when a standardized communication protocol is used between display device 150 and SS 8, commercially available transceiver circuits may be utilized that incorporate processing circuitry to handle low level data communication functions such as the management of data encoding, transmission frequencies, handshake protocols, security, and the like. In such embodiments, processor 126 of display device 150 and/or processor 11 of SS 8 may not need to manage these activities, but instead provide desired data values for transmission, and manage high level functions such as power up or power down, set a rate at which messages are transmitted, and the like. Instructions and data values for performing these high level functions can be provided to the transceiver circuits via a data bus and transfer protocol established by the manufacturer of transceivers 129 and 16. However, in embodiments where a standardized communication protocol is not used between transceivers 129 and 16 (e.g., when non-standardized or modified protocols are used), processors 126 and 11 may be configured to execute instructions associated with proprietary communications protocols (e.g., one or more of the communications protocols described herein) to control and manage their respective transceivers. In addition, when non-standardized or modified protocols are used, customized circuitries may be used to service such protocols.

Processor 126 may include processor sub-modules, including, by way of example, an applications processor that interfaces with and/or controls other elements of display device 150 (e.g., connectivity interface 128, analyte sensor application 121 (hereinafter "sensor application 121"), display 125, sensor(s) 163, memory 127, storage 123, etc.). In certain embodiments, processor 126 is configured to perform functions related to device management, such as, for example, managing lists of available or previously paired devices, information related to network conditions (e.g., link quality and the like), information related to the timing, type, and/or structure of messaging exchanged between SS 8 and display device 150, and so on. Processor 126 may further be configured to receive and process user input, such as, for example, a user's biometric information, such as the user's finger print (e.g., to authorize the user's access to data or to be used for authorization/encryption of data, including analyte data), as well as analyte data.

Processor 126 may include and/or be coupled to circuitry such as logic circuits, memory, a battery and power circuitry, and other circuitry drivers for periphery components and audio components. Processor 126 and any sub-processors thereof may include logic circuits for receiving, processing, and/or storing data received and/or input to display device 150, and data to be transmitted or delivered by display device 150. As described above, processor 126 may be coupled by a bus to display 125, connectivity interface 128, storage 123, etc. Hence, processor 126 may receive and process electrical signals generated by these respective elements and thus perform various functions. By way of example, processor 126 may access stored content from storage 123 and memory 127 at the direction of analyte sensor application 121, and process the stored content to be displayed by display 125. Additionally, processor 126 may process the stored content for transmission via connectivity interface 128 to SS 8 and/or server system 134. Display device 150 may include other peripheral components not shown in detail in FIG. 1B.

In certain embodiments, memory 127 may include volatile memory, such as random access memory (RAM) for storing data and/or instructions for software programs and applications, such as analyte sensor application 121. Display 125 presents a GUI associated with operating system 162 and/or analyte sensor application 121. In various embodiments, a user may interact with analyte sensor application 121 via a corresponding GUI presented on display 125. By way of example, display 125 may be a touchscreen display that accepts touch input. Analyte sensor application 121 may process and/or present analyte-related data received by display device 150 and present such data via display 125. Additionally, analyte sensor application 121 may be used to obtain, access, display, control, and/or interface with analyte data and related messaging and processes associated with SS 8 (e.g., and/or any other medical device (e.g., insulin pump or pen) that are communicatively coupled with display device 150), as is described in further detail herein.

Storage 123 may be a non-volatile storage for storing software programs, instructions, data, etc. For example, storage 123 may store analyte sensor application 121 that, when executed using processor 126, for example, receives input (e.g., by a conventional hard/soft key or a touch screen, voice detection, or other input mechanism), and allows a user to interact with the analyte data and related content via display 125. In various embodiments, storage 123 may also store user input data and/or other data collected by display device 150 (e.g., input from other users gathered via analyte sensor application 121). Storage 123 may further be used to store volumes of analyte data received from SS 8 (or any other medical data received from other medical devices (e.g., insulin pump, pen, etc.) for later retrieval and use, e.g., for determining trends and triggering alerts.

As described above, SS 8, in certain embodiments, gathers analyte data from analyte sensor 10 and transmits the same or a modified version of the collected data to display device 150. Data points regarding analyte values may be gathered and transmitted over the life of analyte sensor 10 (e.g., in the range of 1 to 30 days or more). New measurements may be transmitted often enough to adequately monitor glucose levels. In certain embodiments, rather than having the transmission and receiving circuitry of each of SS 8 and display device 150 continuously communicate, SS 8 and display device 150 may regularly and/or periodically establish a communication channel among each other. Thus, in such embodiments, SS 8 may, for example, communicate with display device 150 at predetermined time intervals. The duration of the predetermined time interval can be selected to be long enough so that SS 8 does not consume too much power by transmitting data more frequently than needed, yet frequent enough to provide substantially real-time sensor information (e.g., measured glucose values or analyte data) to display device 150 for output (e.g., via display 125) to the user. While the predetermined time interval is every five minutes in some embodiments, it is appreciated that this time interval can be varied to be any desired length of time. In other embodiments, transceivers 129 and 16 may be continuously communicating. For example, in certain embodiments, transceivers 129 and 16 may establish a session or connection there between and continue to communicate together until the connection is lost.

Analyte sensor application 121 may be downloaded, installed, and initially configured/setup on display device 150. For example, display device 150 may obtain analyte sensor application 121 from server system 134, or from another source, such as an application store or the like, via a network, e.g., network 190. Following installation and setup, analyte sensor application 121 may be configured to access, process, and/or interface with analyte data (e.g., whether stored on server system 134, locally from storage 123, from SS 8, or any other medical device). By way of example, analyte sensor application 121 may present a menu that includes various controls or commands that may be executed in connection with the operation of SS 8, display device 150, one or more other display devices (e.g., display device 110, 130, 140, etc.), and/or one or more other partner devices, such as an insulin pump. For example, analyte sensor application 121 may be used to interface with or control other display and/or partner devices, for example, to deliver or make available thereto analyte data, including for example by receiving/sending analyte data directly to the other display and/or partner device and/or by sending an instruction for SS 8 and the other display and/or partner device to be connected.

After downloading analyte sensor application 121, as one of the initial steps, the user may be directed by analyte sensor application 121 to wirelessly connect display device 150 to the user's SS 8, which the user may have already placed on their body. A wireless communication path 180 between display device 150 and SS 8 allows SS 8 to transmit analyte measurements to display device 150 and for the two devices to engage in any of the other interactions described above.

Example Seamless and Continuous Authentication of Patients

As discussed, as patients increasingly use display devices (e.g., display device 150, such as a mobile device) to manage medical conditions (e.g., diabetes), one issue of concern is that many of these devices can be compromised by malicious actors (or other third parties) who can use the devices to interfere with patient care. In one non-limiting example, a malicious actor can gain access to a patient's mobile device (e.g., display device 150), access diabetes management software (e.g., analyte sensor application 121) running on the patient's mobile device, and modify parameters of the diabetes management software and/or the patient's continuous glucose monitor (e.g., SS 8) used for managing the patient's medical condition (e.g., diabetes). Such parameters can include, for example, calibration settings, alert/alarm settings, threshold settings, etc.

To mitigate unauthorized access to the medical device software on a user's display device, current medical device software will periodically authenticate the user, for example, by requiring the user to periodically and actively interact with the display device that is executing the medical device software. In one example, the medical device software may prompt the user to periodically enter user credentials (e.g., username and/or password) on the display device, and may authenticate the user based on the user credentials. In another example, the medical device software may prompt the user to periodically provide biometric input, and may authenticate the user based on the biometric input. In such an example, the user may be prompted to physically place a fingerprint on the display device, physically hold the display device to the user's face for a facial scan, or a combination thereof.

As noted, however, one issue with conventional authentication methods is that they require periodic and active patient interaction with the display device. That is, current medical device software may require the user to periodically provide user credentials and/or biometric input in order to allow the user to use (or continue to use) the medical device software. However, performing authentication based on periodic and active interaction with a display device can be significantly burdensome on the user and, in turn, may cause the user to stop (or reduce) monitoring of their medical condition. For instance, requiring a patient with diabetes to periodically authenticate (e.g., every 2, 3, 5, or 10 minutes, or some other time interval) in order to access the patient's glucose information via the medical device software on the patient's display device may cause the patient to stop monitoring their glucose information, negatively impacting the patient's health. Additionally, performing authentication based on periodic and active interaction with the display device may consume excessive resources, such as power resources, compute resources, etc. For example, periodically prompting the user over time to actively interact with the display device can lead to increased power (and battery) consumption.

To address the issues of periodic active authentication discussed above, certain embodiments described herein provide techniques for passively authenticating a user (e.g., patient) over time to allow the user to use (or continue to use) a medical device software (e.g., analyte sensor application 121) running on the user's display device (e.g., display device 150). In certain embodiments, the passive user authentication described herein is performed in a manner that does not involve active (or explicit) user interaction with a display device. That is, in certain embodiments, medical device software may not (at least initially) explicitly ask (e.g., prompt) the user to input a set of user credentials (e.g., username, password, or a combination thereof), to provide biometric input (e.g., fingerprint, facial scan, etc.), or a combination thereof, via their display device.

As described in greater detail below, in certain embodiments, a technique is provided herein for using one or more (or a combination of) different types of data to perform a passive continuous authentication of the user. The different types of data can include, for example, sensor data (e.g., acceleration, heart rate, glucose reading, etc.), pre-processed data (e.g., patient gait, eating pattern, sleeping pattern, etc.), environmental information (e.g., user location, time of day, temperature, speech, surrounding audio, wireless signals, etc.), or a combination thereof.

Using one or more (or a combination of) different types of data to perform passive continuous authentication of the user allows the medical device software on a user's display device to verify that the correct user is accessing the medical device software (as opposed to some other user) without requiring the user to explicitly interact with the display device. In certain embodiments, the correct user is a registered user of the display device. For example, the registered user may be the user that initially registers with the medical device software. In particular, when a user initially downloads the medical device software on their display device, the user may input certain user information (e.g., biographical information, location information, medical information, and the like) into the medical device software. The medical device software may store the user's information as belonging to the user that owns the display device or is using the display device to get sensor measurements from an analyte sensor associated with the display device. Accordingly, the passive continuous authentication described herein can enhance a user's experience with using medical device software to manage patient care, for example, by significantly reducing the requirement for periodically and actively interacting with the display device for authentication in order to use the medical device software.

FIG. 2 illustrates an example workflow 200 for passive continuous authentication of a user, according to certain embodiments. The workflow 200 may be implemented by a display device (e.g., display device 150). In an exemplary embodiment, the workflow 200 is performed by analyte sensor application 121, which is an example of a medical device software, executed on the display device. As shown in FIG. 2, for example, the analyte sensor application 121 may execute an authentication algorithm 210, which is configured to perform passive continuous authentication of a user, based on one or more inputs, which may include raw sensor data 220, pre-processed data 230 (also referred to as biometric input), environmental data 240, or combinations thereof.

The passive continuous authentication performed by the authentication algorithm 210 based on the raw sensor data 220, pre-processed data 230, and/or environmental data 240 may allow the analyte sensor application 121 to verify the user's identity, without periodically requiring the user to explicitly interact with the display device. For example, the authentication algorithm 210 may obtain the raw sensor data 220, pre-processed data 230, and/or environmental data 240 without explicitly prompting the user for the information. The authentication algorithm 210 can use the information to verify that it is the registered user that is interacting with the analyte sensor application 121 on the user's display device (as opposed to another person that may be interacting with the analyte sensor application 121 on the user's display device). As noted, such passive continuous authentication allows the user (e.g., patient or another person associated with the patient) to more easily manage the patient's medical condition via the analyte sensor application 121. For example, a diabetic patient may be able to access their glucose information via the analyte sensor application 121 over time (e.g., a day, multiple days, etc.) without having to periodically and explicitly input user credentials or biometric input.

With respect to FIG. 2, the raw sensor data 220 is generally analyte data that is obtained from an analyte sensor system, such as SS 8, and/or non-analyte data that is obtained (or output) from one or more non-analyte sensors, such as sensor(s) 163 of a display device(s). For example, the raw sensor data 220 may be directly read from the sensor(s) 163 (e.g., accelerometer, gyroscope, GPS sensor, etc.) of the display device, obtained from sensor(s) 163 of another display device, and/or directly read from the transceiver 16 of the SS 8.

The pre-processed data 230 is generally a higher-level input than the raw sensor data 220. For example, the pre-processed data 230 may include an indication of a high-level action (or biometric input) (e.g., eating pattern, sleeping pattern, gait, speech pattern, etc.) determined based on the raw sensor data 220. In certain embodiments, the analyte sensor application 121 includes an analysis tool 205, which is configured to process the raw sensor data 220 and generate the pre-processed data 230. For example, the analysis tool 205 may evaluate the raw sensor data 220 using one or more algorithms to classify an event(s) and/or action(s) from the raw sensor data 220. Such algorithm(s) may include statistical-based algorithms, artificial intelligence/machine learning based algorithms, rule-based algorithms, or combinations thereof. Although FIG. 2 depicts the analysis tool 205 as being separate from the authentication algorithm 210, in certain embodiments, the analysis tool 205 may be integral to the authentication algorithm 210.

The environmental data 240 may be provided by one or more environmental devices in proximity to the user. Such environmental devices may supply ambient information to indicate that the display device is in the user's environment. The environmental data 240 may include communication signals, such as NFC signals, Bluetooth signals, and WiFi traffic, as illustrative, non-limiting examples.

The authentication algorithm 210 can use any one of (or combination of) raw sensor data 220, pre-processed data 230, and environmental data 240 to determine if a user is successfully authenticated.

In certain embodiments, the authentication algorithm 210 uses solely raw sensor data 220 to determine whether the user is successfully authenticated. In an exemplary embodiment, the authentication algorithm 210 uses analyte data (e.g., glucose measurements) obtained from the user's transmitter (e.g., transceiver 16 of the SS 8) to perform passive continuous authentication of the user. For example, the display device 150 may obtain analyte data from the transmitter when the display device 150 is in close proximity to the transmitter. In such an example, the authentication algorithm 210 may infer based on receipt of analyte data from the transmitter that the patient is in possession of their display device 150. In certain embodiments, the authentication algorithm 210 may determine that a user (e.g., patient) is successfully authenticated when analyte data has been periodically received from the transmitter over a time period (e.g., every 5 minutes (or some other time interval) for the last 24 hours (or some other time period)). For example, the authentication algorithm 210 can use the display device's recent history of successful receipt of analyte data to infer that the display device has been (and still is) in possession of the patient.

Similarly, in certain embodiments, the authentication algorithm 210 may determine that a user (e.g., patient) is not successfully authenticated when a predetermined amount of time (e.g., 5 minutes or some other amount of time) has elapsed since a previous time instance in which analyte data was received from the transmitter. For example, in such an embodiment, the authentication algorithm 210 may infer that the display device 150 is no longer in possession of the patient (e.g., the display device 150 may have been lost, stolen, compromised, etc.).

In certain embodiments, the authentication algorithm 210 uses analyte data (e.g. glucose measurements) obtained from the user's transmitter (e.g., transceiver 16 of the SS 8) in addition to other raw sensor data 220 (e.g., heartbeat data, etc.) to perform passive continuous authentication of the user. In such an embodiment, the heartbeat data may be obtained from a heart rate sensor of the user's display device (e.g., smartwatch, mobile device, etc.). In some instances, using multiple types of raw sensor data 220 (e.g., glucose measurements and heartbeat data) may reduce the number of false positives from the authentication algorithm 210 (e.g., authentication result falsely indicating that the user is successfully authenticated) and/or the number of false negatives from the authentication algorithm 210 (e.g., authentication result falsely indicating that the user is not successfully authenticated).

For example, in addition to determining that analyte data has been periodically received from the transmitter over a time period, the authentication algorithm 210 can determine whether the heartbeat data is indicative of the patient's heartbeat (based on the patient's heartbeat data history over a prior period of time). For example, the authentication algorithm 210 may store a pattern of the patient's heartbeats on the display device and compare the pattern of the patient's heartbeats with the heartbeat data. When the authentication algorithm 210 (i) determines, based on the comparison, that the heartbeat data is indicative of the patient's heartbeat and (ii) determines analyte data has been periodically received from the transmitter over a time period, the authentication algorithm 210 can determine that a user (e.g., patient) is successfully authenticated. On the other hand, when the authentication algorithm 210 determines at least one of (i) the heartbeat data is not indicative of the patient's heartbeat, based on the comparison or (ii) analyte data has not been periodically received from the transmitter over a time period, the authentication algorithm 210 can determine that a user is not successfully authenticated.

While using raw sensor data 220 may enable the authentication algorithm 210 to perform passive continuous authentication of a user over time, in some instances, using raw sensor data 220 alone may be insufficient to mitigate against certain types of malicious activity. For example, a malicious actor may be able to gain control of a user's display device and remain in proximity to the user, such that the user's display device is still able to receive the user's analyte data from the user's transceiver 16. In such an example, performing passive continuous authentication based on raw sensor data 220 alone may be insufficient to verify that it is the registered user (as opposed to the malicious actor) that is using the analyte sensor application 121 on the user's display device.

Accordingly, in certain embodiments, the authentication algorithm 210 is configured to use pre-processed data 230 to determine whether the user is successfully authenticated. As noted, the pre-processed data 230 (or biometric input) may be output from the analysis tool 205, which is configured to determine a higher-level action (or activity) of the user based on the raw sensor data 220. The pre-processed data 230 can indicate various different types of user activity. For example, the pre-processed data 230 can indicate a sleeping pattern (or sleep pattern) of the user. The sleeping pattern may include a time instance in which the user falls asleep and/or duration of the user's sleep. The analysis tool 205 can determine the user's sleeping pattern based on one or more sensors of the user's display device(s) (e.g., mobile device and/or wearable device, such as a smartwatch, etc.). For example, an indication that the user is sleeping can be inferred from the accelerometer sensor, GPS sensor, and time.

In an exemplary embodiment, the authentication algorithm 210 uses the user's sleeping pattern (e.g., patient's sleeping pattern) to passively authenticate the user at certain times of the day (e.g., morning time, evening time, etc.) after an idle period (e.g., a time period in which there is a lack of user interaction with the display device). For example, the authentication algorithm 210 may use the sleep pattern (e.g., time instances in which the user falls asleep and/or a duration of the user's sleep) of the user to verify the user's identity, such that when the user subsequently wakes up after a period of sleep, the analyte sensor application 121 can refrain from prompting the user to interact with the display device for authentication. For example, information about the user's sleep pattern may be stored on the display device (or a server), and the authentication algorithm 210 can continuously compare the user's stored sleep pattern with the user's current sleep pattern. When the authentication algorithm 210 determines, based on the comparison, that the user's current sleep pattern matches the user's stored sleep pattern, then the authentication algorithm 210 can determine that the user is successfully authenticated.

In some examples, the pre-processed data 230 can indicate the user's gait. The analysis tool 205 can determine the user's gait based on the accelerometer(s) of the user's display device(s) (e.g., mobile device and/or wearable device, such as a smartwatch, etc.). For example, the analysis tool 205 can monitor the accelerometer(s) over time and evaluate the accelerometer data with a gait detection algorithm to determine the user's gait. For instance, the analysis tool 205 can detect when the user is walking, running, etc., based on the accelerometer(s), and can determine the patient's gait based on the accelerometer data obtained while the user is walking or running.

In an exemplary embodiment, the authentication algorithm 210 uses the user's gait (e.g., patient's gait) to passively authenticate the user. For example, the authentication algorithm 210 can detect when the patient is walking/running, based on the accelerometer(s) of the display device, and determine the user's current gait based on evaluating the accelerometer data with a gait detection algorithm. The authentication algorithm 210 can then determine whether the user's current gait is consistent with the user's average gait over a prior time period (e.g., prior last 1 month or some other amount of time). If the user's current gait is consistent with the user's average gait, then the analyte sensor application 121 can determine that the user is successfully authenticated. Similarly, if the user's current gait is inconsistent with the user's average gait, then the analyte sensor application 121 may determine that the user is not successfully authenticated.

In some examples, the pre-processed data 230 can indicate the user's eating pattern. The analysis tool 205 can determine the user's eating pattern based on data received from sensor(s) 163 of the user's display device(s) (e.g., mobile device and/or wearable device, such as a smartwatch, etc.) and/or glucose readings from the transceiver 16 of the user's SS 8. For example, sensor(s) 163 from the user's display device(s) and/or the glucose readings can indicate when the user cats, how the user cats, and where the user cats. Assuming the user (e.g., patient) is wearing a smartwatch, the analysis tool 205 can obtain wrist actigraphy data from the smartwatch and determine how the user eats (e.g., motion of the user's hands) at particular times of the day.

In an exemplary embodiment, the authentication algorithm 210 uses the user's eating pattern (e.g., patient's eating pattern) to passively authenticate the user. For example, the user may follow a particular dietary plan that involves eating at particular times of the day. In such an example, the user may use a certain motion when eating and may cat for a certain duration. If the authentication algorithm 210 determines that the user's eating pattern is consistent with the user's average eating pattern, then the authentication algorithm 210 can determine that the user is successfully authenticated. Similarly, if the authentication algorithm 210 determines that the user's eating pattern is inconsistent with the user's average eating pattern, then the authentication algorithm 210 can determine that the user is not successfully authenticated.

In some examples, the pre-processed data 230 can indicate the user's talking/speech pattern. The analysis tool 205 can determine the user's speech pattern based on data received from sensor(s) 163 of the user's display device(s) (e.g., mobile device and/or wearable device, such as a smartwatch, etc.). Such sensors can include, for example, microphone(s) that are configured to capture audio in the user's environment.

In an exemplary embodiment, the authentication algorithm 210 uses the user's speech pattern (e.g., patient's speech pattern) to passively authenticate the user, for example, when the user is talking. For example, when the user uses their display device (e.g., mobile device) to make an audio/video call, the authentication algorithm 210 can determine the current speech pattern of the user and determine whether the current speech pattern is consistent with the user's average speech pattern. If the authentication algorithm 210 determines that the user's speech pattern is consistent with the user's average speech pattern, then the authentication algorithm 210 can determine that the user is successfully authenticated. Similarly, if the authentication algorithm 210 determines that the user's speech pattern is inconsistent with the user's average speech pattern, then the authentication algorithm 210 can determine that the user is not successfully authenticated.

In some examples, the pre-processed data 230 can indicate the user's temperature pattern. The analysis tool 205 can determine the user's temperature pattern based on data received from sensor(s) 163 of the user's display device(s) (e.g., mobile device and/or wearable device, such as a smartwatch, etc.). Such sensors can include, for example, a temperature sensor(s).

In an exemplary embodiment, the authentication algorithm 210 uses the user's temperature pattern (e.g., patient's temperature pattern) to passively authenticate the user. For example, certain diabetic patients may have impaired temperature regulation during exposure to thermal stress. Individuals with type 1 diabetes, in particular, may have increased rates of heat loss during periods of exercise. For such diabetic patients, the authentication algorithm 210 can use the temperature pattern of the patient during certain periods of activity (e.g., exercise) to passively authenticate the patient. If the authentication algorithm 210 determines that the user's temperature pattern is consistent with the user's average temperature pattern, then the authentication algorithm 210 can determine that the user is successfully authenticated. Similarly, if the authentication algorithm 210 determines that the user's temperature pattern is inconsistent with the user's average temperature pattern, then the authentication algorithm 210 can determine that the user is not successfully authenticated.

In some examples, the pre-processed data 230 can indicate the user's behavioral pattern of interaction with the user's display device, such as a mobile device. For example, certain mobile operating systems may allow a user to perform certain shortcuts to unlock functionality on a mobile device. For instance, a user may double or triple tap the back surface of the mobile device to turn on/off the flashlight or to bring up a photo application. Such behavioral patterns can be detected by the mobile operating system (e.g., operating system 162) and used for performing passive continuous authentication of the user. In certain embodiments, the authentication algorithm 210 uses the user's behavioral pattern of interaction with the mobile operating system (e.g., operating system 162) to verify the user's identity for accessing the analyte sensor application 121. If, for example, the authentication algorithm 210 determines that the user's behavioral pattern is consistent with the user's average behavioral pattern, then the authentication algorithm 210 can determine that the user is successfully authenticated. Similarly, if the authentication algorithm 210 determines that the user's behavioral pattern is inconsistent with the user's average behavioral pattern, then the authentication algorithm 210 can determine that the user is not successfully authenticated.

In some examples, the pre-processed data 230 can indicate the user's vibration pattern during certain periods of activity (e.g., vibration exercises). The analysis tool 205 can determine the user's vibration pattern from data received from sensor(s) 163 of the user's display device(s). Such sensors can include, for example, a piezoelectric vibration sensor, an accelerometer sensor, etc.

In an exemplary embodiment, the authentication algorithm 210 uses the user's vibration pattern (e.g., patient's vibration pattern) to passively authenticate the user. For example, certain patients with type 2 diabetes may use whole body vibration exercises to control (or treat) type 2 diabetes. During these periods of activity, the authentication algorithm 210 can use the patient's current vibration information (detected via the patient's transceiver 16) to authenticate the patient's identity. For example, if the authentication algorithm 210 determines that the user's vibration pattern is consistent with the user's average vibration pattern, then the authentication algorithm 210 can determine that the user is successfully authenticated. Similarly, if the authentication algorithm 210 determines that the user's vibration pattern is inconsistent with the user's average vibration pattern, then the authentication algorithm 210 can determine that the user is not successfully authenticated.

As noted above, in certain embodiments, the authentication algorithm 210 is configured to use environmental data 240 in addition to raw sensor data 220 and/or pre-processed data 230 to perform passive continuous authentication of a user. Using environmental data 240 in addition to raw sensor data 220 and/or pre-processed data 230 may allow for a more robust determination of whether a user is successfully authenticated (e.g., a fewer number of false positives).

In some examples, the environmental data 240 can include communications from the user's transmitter (e.g., transceiver 16 of SS 8). For example, the analyte sensor application 121 may receive communications (e.g., via NFC, Bluetooth, WiFi, etc.) from the user's transmitter (e.g., transceiver 16) that indicate that it is the user (e.g., patient) (and not another person) that is using the analyte sensor application 121. For example, assume Person 1 has type 1 diabetes and utilizes medical device software (e.g., analyte sensor application 121) on Person 1's display device. While Person 2 could use medical device software on Person 1's display device and still receive communications from Person 1's transmitter (assuming Person 1 and Person 2 are in close proximity), it is unlikely that Person 2 could use the medical device software on Person 1's display device and still receive communications from Person 1's transmitter at all times of the day. As such, if the medical device software is able to receive communications from the user's transmitter at different times of the day, the authentication algorithm 210 can use this data to authenticate the user's identity.

In some examples, the environmental data 240 can include WiFi service set identifiers (SSIDs). For example, detection of a WiFi SSID by the analyte sensor application 121 may indicate that the user (e.g., patient) is currently in the user's environment (e.g., home, workplace, doctor's office, hospital, medical facility, etc.). In other examples, the environmental data 240 can include Bluetooth communications from other devices (associated with the user) (e.g., alarm clocks, other display devices, etc.). For example, detection of Bluetooth communications from other devices associated with the user may indicate that the user (e.g., patient) is currently in the user's environment. In certain embodiments, the authentication algorithm 210 can use such WiFi SSIDs and/or Bluetooth communications to determine whether the user is successfully authenticated. For example, if the WiFi SSIDs and/or Bluetooth communications indicate the user is in the user's environment, then the authentication algorithm 210 can determine that the user is successfully authenticated. Similarly, if the WiFi SSIDs and/or Bluetooth communications indicate the user is not in the user's environment, then the authentication algorithm 210 can determine that the user is not successfully authenticated.

In some examples, the environmental data 240 can include user location data provided by one of the sensor(s) 163, such as a GPS sensor. In certain embodiments, the authentication algorithm 210 can use the location of the user's display device (e.g., mobile device) to authenticate the user (e.g., patient). For example, if the user's location information indicates a pattern of visits to a medical facility within the city/town of the user, then information about, for example, a recent visit to the medical facility can be used as authentication data to successfully authenticate the user. On the other hand, if the user's location information indicates a pattern of visits to a building that hasn't been previously visited by the user or to a new city/town, then the authentication algorithm 210 can use the user's location information to determine that the user is not successfully authenticated.

In some examples, environmental data 240, in addition to or as an alternative to pre-processed data 230, can be used to establish a pattern (or signature) that is indicative of the user. For example, each user may use user-specific behavior (s) when interacting with the user's display device. As such, a display device may exhibit specific characteristics as a result of its repeated use by the user. For example, each display device may have a different power signature as a result of its repeated use by the user (e.g., a user may charge their device more often than other users, a user may use a special power adapter, etc.). In another example, environmental noise (including or apart from speech) may also be used as an indicator for authenticating the user.

Continuing with FIG. 2, the authentication algorithm 210 outputs, at a particular point in time, an authentication result indicating "Yes" or "No," where "Yes" indicates the user is successfully authenticated and "No" indicates the user is not successfully authenticated. If the authentication algorithm 210 determines that the user is not successfully authenticated at the particular point in time, then the authentication algorithm 210 continues to collect information (e.g., raw sensor data 220, pre-processed data 230, and/or environmental data 240) that may be sufficient to authenticate the user at a subsequent point in time. That is, instead of automatically intervening (e.g., by blocking execution or enforcing policy) when an unsuccessful authentication occurs, the authentication algorithm 210 continues to collect information in a passive manner in order to authenticate the user.

Consider an exemplary scenario in which a user, such as a diabetic patient, allows another user to interact with the patient's display device (e.g., mobile device) for a period of time. In such a scenario, the medical device software (e.g., analyte sensor application 121) running on the patient's display device may not be able to successfully authenticate the patient, when the display device is in possession of the other user. For example, the pre-processed data 230 may indicate a different biometric pattern than the patient's biometric pattern. However, the medical device software may continue to collect information in a passive manner, such that when the mobile device is back in possession of the patient, the medical device software can successfully authenticate the patient based on the raw sensor data 220, pre-processed data 230, and/or environmental data 240.

Figure 3:
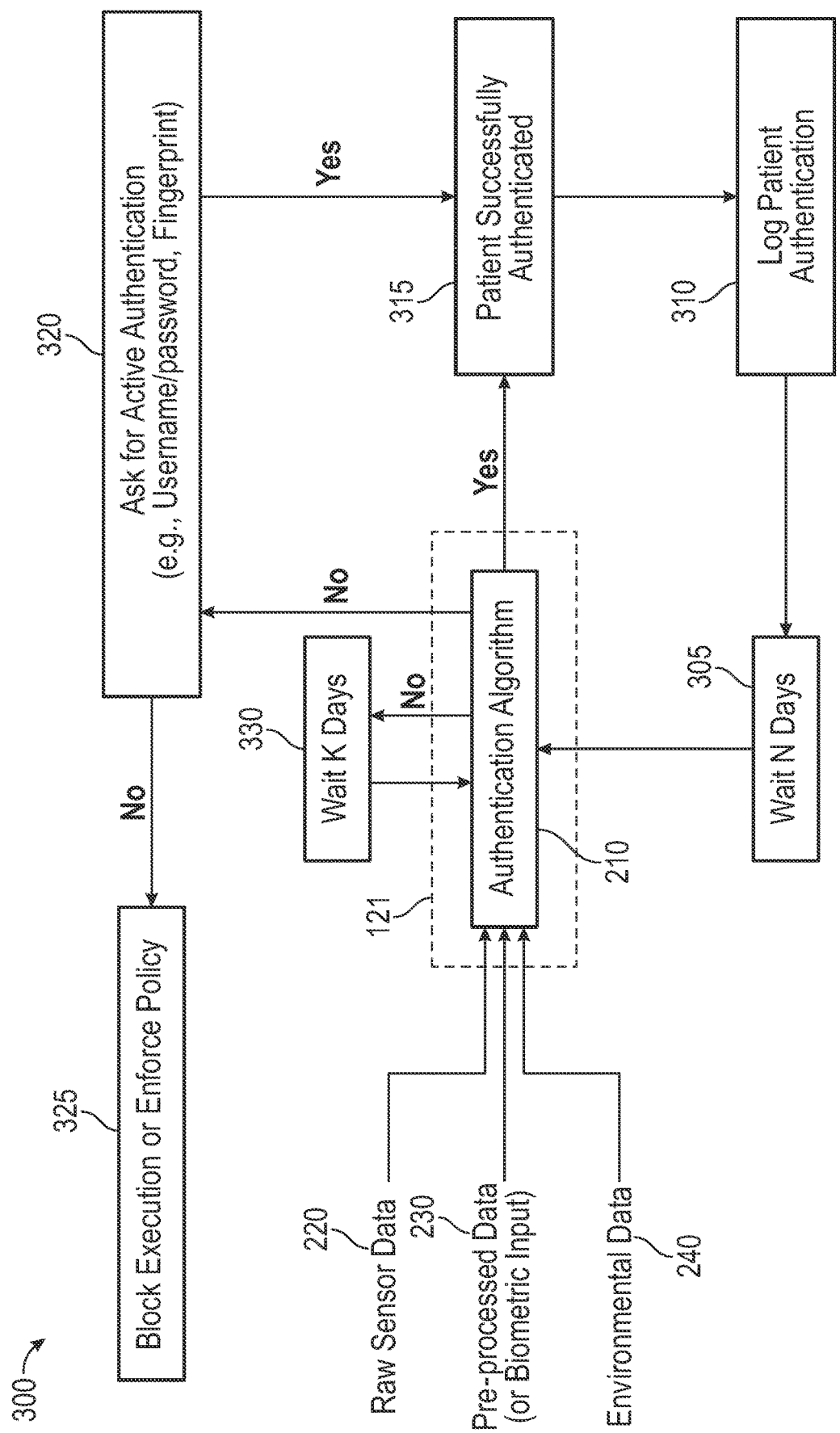
FIG. 3 illustrates another example workflow for passive continuous authentication of a user, according to certain embodiments disclosed herein.

FIG. 3 illustrates another example workflow 300 for passive continuous authentication of a user, according to certain embodiments. The workflow 300 may be implemented by a display device (e.g., display device 150). In an exemplary embodiment, the workflow 300 is performed by analyte sensor application 121, which is an example of medical device software, executed on the display device.

Similar to the workflow 200 shown in FIG. 2, in the workflow 300 depicted in FIG. 3, the analyte sensor application 121 may execute an authentication algorithm 210, which is configured to perform passive continuous authentication of a user, based on one or more inputs, which may include raw sensor data 220, pre-processed data 230 (also referred to as biometric input), environmental data 240, or combinations thereof.

Compared to the workflow 200 in FIG. 2, in the workflow 300 depicted in FIG. 3, once a user is successfully authenticated (315), the authentication algorithm 210 may log the time instance that the successful authentication took place (310). The authentication algorithm 210 may continue to collect information (e.g., raw sensor data 220, pre-processed data 230, and/or environmental data 240) in a passive manner while waiting for a first period of time (e.g., N days or some other amount of time) to elapse (305). The authentication algorithm 210 may then repeat the passive authentication process after the first period of time has elapsed. Note, the first period of time is configurable such that, for example, it may be determined by a user, the organization that created the medical device software, or in accordance with a regulatory authority or standard.

On the other hand, if the authentication algorithm 210 determines that the user is not successfully authenticated, then the authentication algorithm may continue to collect information (e.g., raw sensor data 220, pre-processed data 230, and/or environmental data 240) in a passive manner while waiting for a second period of time (e.g., K days or some other amount of time) to elapse (330). For example, assuming the user is a diabetic patient, the authentication algorithm may not be able to successfully authenticate the user at a particular time instance if the user enters an unknown location, the user loans their display device to another user, the user loses their display device, the user's display device is stolen, etc.

The authentication algorithm 210 may then perform another authentication attempt after the second period of time has elapsed. The authentication algorithm 210 may perform this additional authentication attempt based at least on the additional information collected over the second period of time. For example, the authentication algorithm 210 may be able to authenticate the user based on the user's sleeping pattern, eating pattern, speech pattern, temperature pattern, and so on. Note, the second period of time is configurable such that, for example, it may be determined by the user, the organization that created the medical device software, or in accordance with a regulatory authority or standard. In some cases, K>0 and N>0, but do not have to be integers.

If the authentication algorithm 210 has not been able to authenticate the user after some predetermined amount of time (e.g., a number of iterations of K days have elapsed since a previous successful authentication), then the authentication algorithm 210 may revert to an active authentication method. As shown in FIG. 3, for example, the authentication algorithm 210 may prompt the user for credentials/biometric input (e.g., asking for the user's fingerprint, username/password, facial scan, etc.) in order to authenticate the user (320).

If, after prompting the user for credentials/biometric input (320), the authentication algorithm 210 is still unable to successfully authenticate the user, then the medical device software may block execution of the medical device software on the display device and/or enforce a preconfigured policy (325). In certain embodiments, the medical device software may send an alert/notification to another person associated with the user that the medical device software was unable to authenticate the user. For example, the user may be a patient that is a minor, and the other person may be guardian of the patient.

Figure 4:
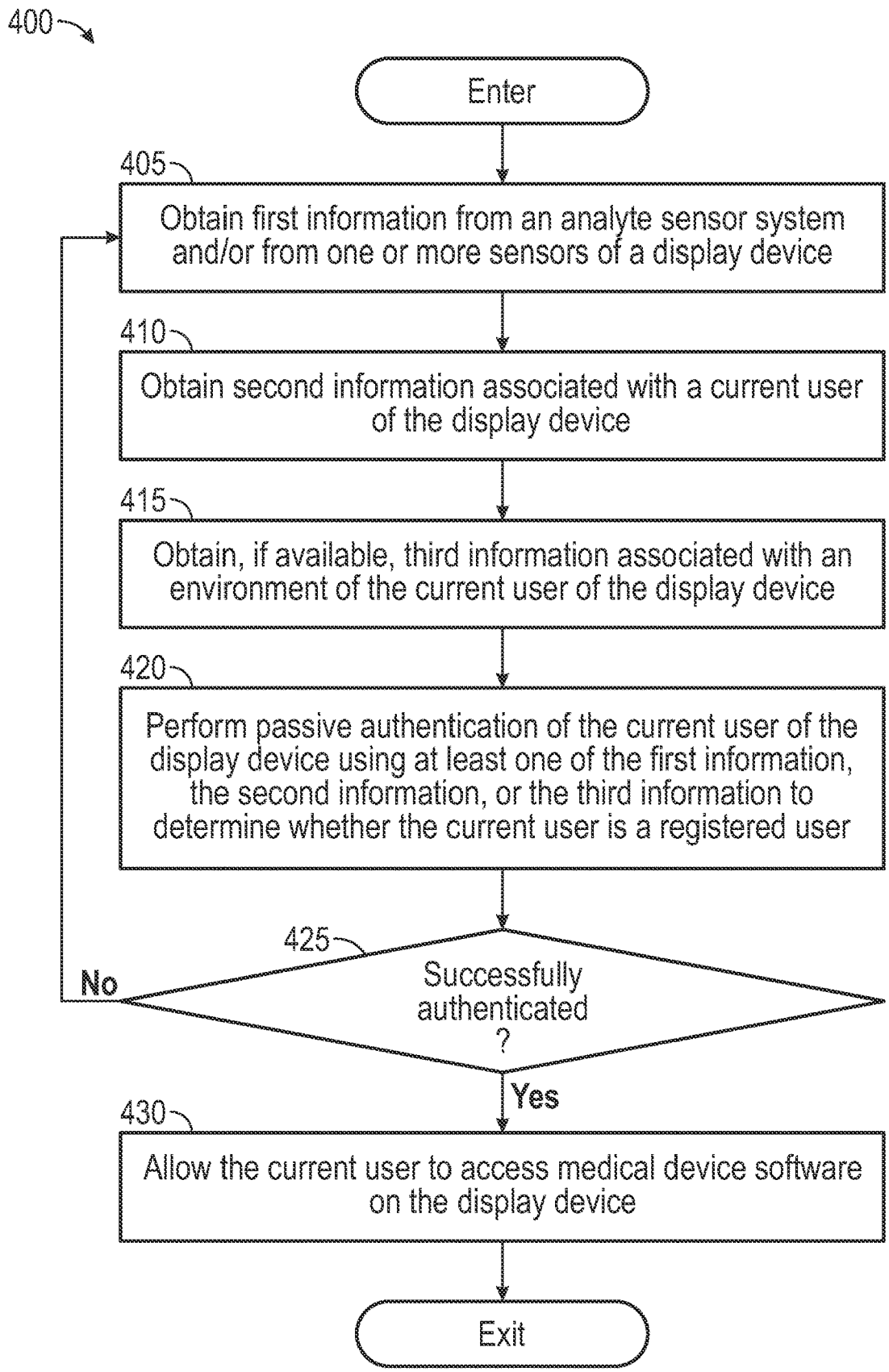
FIG. 4 is a flow diagram illustrating example operations for passive continuous authentication of a user, according to certain embodiments disclosed herein.

FIG. 4 is a flow diagram illustrating example operations 400 for passive continuous authentication of a user (e.g., a patient), according to certain embodiments described herein. The operations 400 may be performed by a display device (e.g., display device 150).

At operation 405, the display device obtains first information (e.g., raw sensor data 220) from an analyte sensor system (e.g., SS 8) and/or from one or more sensors (e.g., sensor(s) 163) of the display device. The first information may include analyte data from the analyte sensor system and/or non-analyte data from one or more non-analyte sensors (e.g., sensor(s) 163). At operation 410, the display device obtains second information (e.g., pre-processed data 230) associated with a current user of the display device. For example, the current user may be a person (e.g., patient) authorized to interact with medical device software running on the display device or another person (e.g., malicious actor) that is not authorized to interact with the medical device software running on the display device. At operation 415, the display device obtains, if available, third information (e.g., environmental data 240) associated with an environment of the current user of the display device. Note that, in certain embodiments, operations 405, 410, and 415 may be performed concurrently in a passive manner (e.g., without explicitly prompting the current user for the first, second, and/or third information).

At operation 420, the display device (via authentication algorithm 210) performs passive authentication of the current user of the display device using at least one of the first information, the second information, or the third information to determine whether the current user is an authenticated user, such as the patient. Operation 420 may be implemented based on any one of (or combination of) information inputs described herein. At operation 425, the display device determines whether the current user is successfully authenticated. If the current user is not successfully authenticated, then the display device continues to passively obtain first information (operation 405), second information (operation 410), and/or third information (operation 415) over a period of time before performing another passive authentication attempt (operation 420). On the other hand, if the current user is successfully authenticated, then, at operation 430, the display device allows the current user to access medical device software (e.g., analyte sensor application 121) running on the display device.

Figure 5:
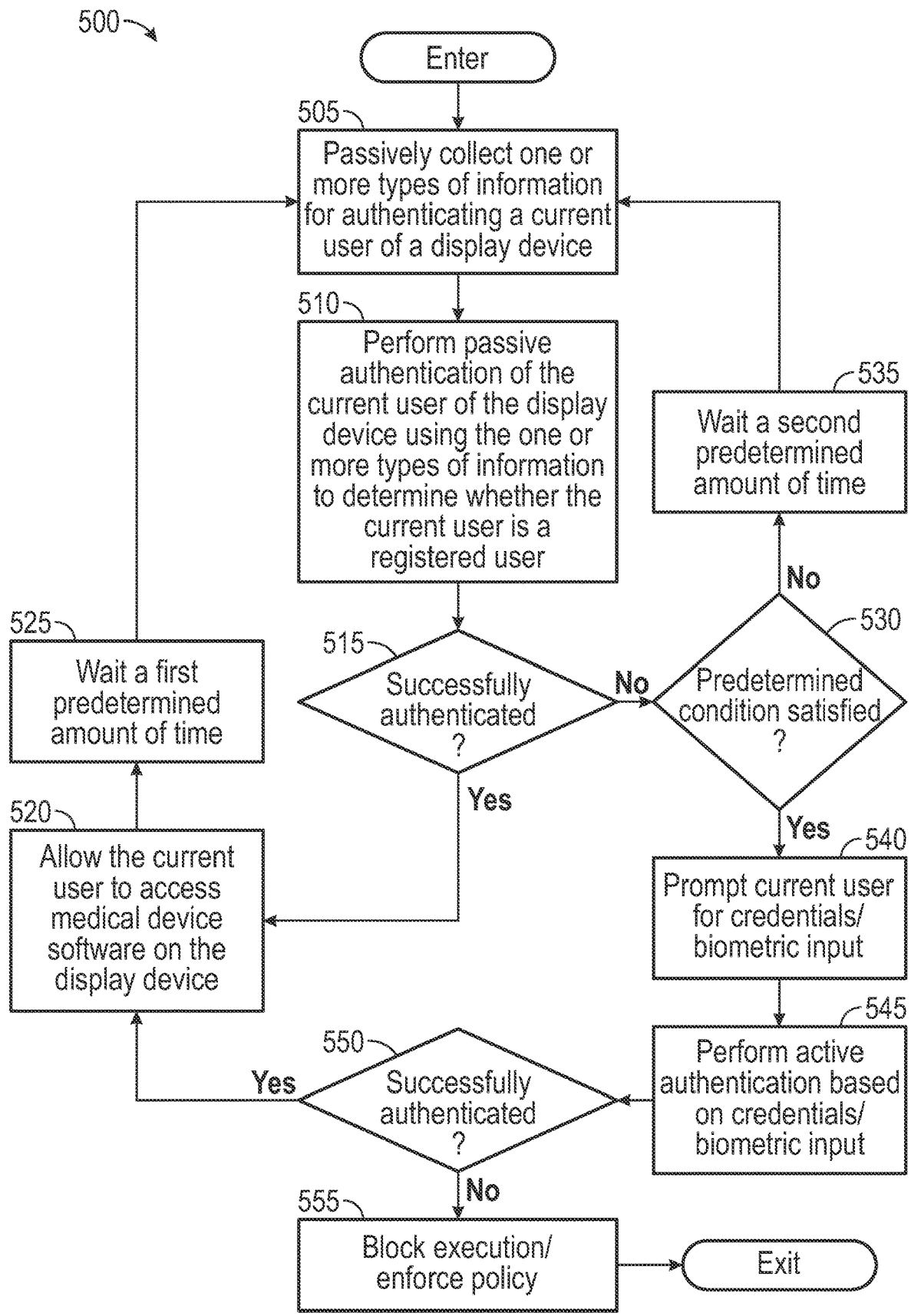
FIG. 5 is a flow diagram illustrating example operations for passive continuous authentication of a user, according to certain embodiments disclosed herein.

FIG. 5 is a flow diagram illustrating example operations 500 for passive continuous authentication of a user (e.g., a patient), according to certain embodiments described herein. The operations 500 may be performed by a display device (e.g., display device 150).

At operation 505, the display device passively collects one or more types of information for authenticating a current user of the display device. As noted, at any particular point in time, the current user may be a person (e.g., patient) authorized to interact with medical device software running on the display device or another person (e.g., malicious actor) that is not authorized to interact with the medical device software running on the display device. The one or more types of information may include raw sensor data (e.g., raw sensor data 220), pre-processed data (e.g., pre-processed data 230), environmental data (e.g., environmental data 240), and combinations thereof.

At operation 510, the display device performs passive authentication of the current user of the display device using the one or more types of information to determine whether the current user is an authenticated user. At operation 515, the display device determines whether the current user is successfully authenticated. If the current user is successfully authenticated (e.g., the current user is the patient), then, at operation 520, then the display device allows the current user to access medical device software (e.g., analyte sensor application 121) running on the display device. At operation 525, the display device waits a first predetermined amount of time and attempts another authentication of the current user of the display device at operations 505 and 510. Note that, in certain embodiments, the operations 525 and 505 may be performed concurrently after a successful authentication of the current user. That is, the display device may passively collect the one or more types of information while waiting for the first predetermined amount of time.

If, at operation 515, the current user is not successfully authenticated, then, at operation 530, the display device determines whether a predetermined condition is satisfied. In certain embodiments, the predetermined condition may include performing a certain number of consecutive authentication attempts that result in unsuccessful authentication of the current user. If the predetermined condition is not satisfied, then, at operation 535, the display device waits a second predetermined amount of time and attempts another authentication of the current user of the display device at operations 505 and 510. Note that, in certain embodiments, the operations 535 and 505 may be performed concurrently after an unsuccessful authentication of the current user. That is, the display device may passively collect the one or more types of information while waiting for the second predetermined amount of time.

If, at operation 530, the predetermined condition is satisfied, then, at operation 540, the display device prompts the current user to enter credentials and/or biometric input via the display device. At operation 545, the display device performs active authentication based on the credentials and/or biometric input. At operation 550, the display device determines whether the current user is successfully authenticated based on the active authentication. If the current user is not successfully authenticated based on the active authentication, then, at block 555, the display device blocks execution of the medical device software and/or enforces a pre-configured policy (e.g., sending an alert to a person associated with the patient). On the other hand, if the current user is successfully authenticated based on the active authentication, then the operations 500 proceeds to operation 520.

Advantageously, by performing the passive continuous authentication described herein, medical device software running on a user's display device can avoid (or at least significantly reduce) the need to explicitly interact with the user for authentication, significantly enhancing the user's experience with the medical device software.

As used herein, "a processor," "at least one processor," or "one or more processors" generally refers to a single processor configured to perform one or multiple operations or multiple processors configured to collectively perform one or more operations. In the case of multiple processors, performance of the one or more operations could be divided amongst different processors, though one processor may perform multiple operations, and multiple processors could collectively perform a single operation. Similarly, "a memory," "at least one memory," or "one or more memories" generally refers to a single memory configured to store data and/or instructions or multiple memories configured to collectively store data and/or instructions.

Each of these non-limiting examples can stand on its own or can be combined in various permutations or combinations with one or more of the other examples. The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Geometric terms, such as "parallel", "perpendicular", "round", or "square", are not intended to require absolute mathematical precision, unless the context indicates otherwise. Instead, such geometric terms allow for variations due to manufacturing or equivalent functions. For example, if an element is described as "round" or "generally round", a component that is not precisely circular (e.g., one that is slightly oblong or is a many-sided polygon) is still encompassed by this description.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A computer-implemented method for performing passive continuous authentication of a user of an analyte sensor system, the computer-implemented method comprising:
   obtaining first information comprising analyte sensor data from the analyte sensor system associated with a display device;
   authenticating an identity of the user of the analyte sensor system at a first point in time based on the first information;
   based on authenticating the identity of the user, receiving and displaying at least a first portion of the first information on the display device;
   performing a second authentication of the user at a subsequent time after the first point in time using at least a second portion of the first information including one or more analyte sensor data; and
   displaying updated analyte sensor data included in the first information upon the second authentication of the user.

2. The computer-implemented method of claim 1, wherein authenticating the identity of the user of the display device comprises determining, at the first point in time and based on the first information, whether the user of the display device is a registered user of the display device.

3. The computer-implemented method of claim 2, wherein determining whether the user of the display device is the registered user comprises determining that the user of the display device is the registered user when the analyte sensor data has been obtained within a predetermined period of time prior to the first point in time.

4. The computer-implemented method of claim 2, further comprising obtaining second information associated with the user of the display device, the second information being indicative of at least one biometric input of the user of the display device, wherein the determination at the first point in time of whether the user of the display device is the registered user is based on the first information and the second information.

5. The computer-implemented method of claim 4, wherein determining whether the user of the display device is the registered user of the display device comprises:
   comparing the at least one biometric input of the user of the display device with at least one biometric pattern of the registered user of the display device; and
   determining that the user of the display device is the registered user, based on the comparison.

6. The computer-implemented method of claim 5, wherein determining that the user of the display device is the registered user comprises determining, based on the comparison, that the at least one biometric input of the user of the display device is indicative of the at least one biometric pattern of the registered user.

7. The computer-implemented method of claim 4, further comprising obtaining third information associated with an environment of the user of the display device, wherein the determination at the first point in time of whether the user of the display device is the registered user is further based on the first information, the second information, and the third information.

8. The computer-implemented method of claim 7, wherein the third information comprises one or more communication signals obtained by the display device from at least one computing device in the environment, the at least one computing device being associated with the registered user of the display device.

9. The computer-implemented method of claim 7, wherein the third information comprises location information obtained from a global positioning system (GPS) sensor of the display device.

10. The computer-implemented method of claim 4, further comprising generating the second information that is indicative of the at least one biometric input based on the first information.

11. The computer-implemented method of claim 4, wherein the at least one biometric input comprises at least one of: (i) a sleeping pattern of the user of the display device, (ii) a gait of the user of the display device, (iii) an eating pattern of the user of the display device, (iv) a speech pattern of the user of the display device, (v) a temperature pattern of the user of the display device, (vi) a pattern of interaction of the user with the display device, or (vii) a vibration pattern of the user of the display device.

12. The computer-implemented method of claim 1, further comprising, upon determining that the authentication at the first point in time is not successful, authenticating the identity of the user of the display device at a second point in time subsequent to the first point in time and based on the first information.

13. A non-transitory computer-readable medium storing computer-executable instructions, which when executed by one or more processors of a display device, performs an operation for passive continuous authentication of a user of an analyte sensor system, the operation comprising:
   obtaining first information comprising analyte sensor data from the analyte sensor system associated with the display device;
   authenticating an identity of the user of the analyte sensor system at a first point in time and based on the first information;
   based on authenticating the identity of the user, receiving and displaying at least a first portion of the first information on the display device;
   performing a second authentication of the user at a subsequent time after the first point in time using at least a second portion of the first information including one or more analyte sensor data; and displaying updated analyte sensor data included in the first information upon the second authentication of the user.

14. The non-transitory computer-readable medium of claim 13, wherein authenticating the identity of the user of the display device comprises determining, at the first point in time and based on the first information, whether the user of the display device is a registered user of the display device.

15. The non-transitory computer-readable medium of claim 14, wherein determining whether the user of the display device is the registered user comprises determining that the user of the display device is the registered user when the analyte sensor data has been obtained within a predetermined period of time prior to the first point in time.

16. The non-transitory computer-readable medium of claim 14, the operation further comprising obtaining second information associated with the user of the display device, the second information being indicative of at least one biometric input of the user of the display device, wherein the determination at the first point in time of whether the user of the display device is the registered user is based on the first information and the second information.

17. The non-transitory computer-readable medium of claim 16, the operation further comprising obtaining third information associated with an environment of the user of the display device, wherein the determination at the first point in time of whether the user of the display device is the registered user is based on the first information, the second information, and the third information.

18. The non-transitory computer-readable medium of claim 17, wherein the third information comprises one or more communication signals obtained by the display device from at least one computing device in the environment, the at least one computing device being associated with the registered user of the display device.

19. The non-transitory computer-readable medium of claim 16, the operation further comprising generating the second information that is indicative of the at least one biometric input based on the first information.

20. The non-transitory computer-readable medium of claim 16, wherein the at least one biometric input comprises at least one of: (i) a sleeping pattern of the user of the display device, (ii) a gait of the user of the display device, (iii) an eating pattern of the user of the display device, (iv) a speech pattern of the user of the display device, (v) a temperature pattern of the user of the display device, (vi) a pattern of interaction of the user with the display device, or (vii) a vibration pattern of the user of the display device.

21. The non-transitory computer-readable medium of claim 13, the operation further comprising, upon determining that the authentication at the first point in time is not successful, authenticating the identity of the user of the display device at a second point in time subsequent to the first point in time and based on the first information.

22. A display device comprising:
a transceiver configured to receive analyte sensor data from an analyte sensor system;
one or more sensors configured to generate non-analyte sensor data;
one or more memories collectively storing computer-executable instructions; and
one or more processors coupled to the transceiver, the one or more sensors, and the one or more memories, the one or more processors being collectively configured to execute the computer-executable instructions to cause the display device to perform an operation comprising:
obtaining first information comprising the analyte sensor data from the transceiver;
authenticating an identity of a user of the display device at a first point in time and based on the first information;
based on authenticating the identity of the user, receiving and displaying at least a first portion of the first information on the display device;
performing a second authentication of the user at a subsequent time after the first point in time using at least a second portion of the first information including one or more analyte sensor data; and
displaying updated analyte sensor data included in the first information upon the second authentication of the user.

23. The display device of claim 22, wherein authenticating the identity of the user of the display device comprises determining, at the first point in time and based on the first information, whether the user of the display device is a registered user of the display device.

24. The display device of claim 23, wherein determining whether the user of the display device is the registered user comprises determining that the user of the display device is the registered user when the analyte sensor data has been obtained within a predetermined period of time prior to the first point in time.

25. The display device of claim 23, the operation further comprising obtaining second information associated with the user of the display device, the second information being indicative of at least one biometric input of the user of the display device, wherein the determination at the first point in time of whether the user of the display device is the registered user is based on the first information and the second information.

26. The display device of claim 25, wherein determining whether the user of the display device is the registered user of the display device comprises:
comparing the at least one biometric input of the user of the display device with at least one biometric pattern of the registered user of the display device; and
determining that the user of the display device is the registered user based on the comparison.

27. The display device of claim 26, wherein determining that the user of the display device is the registered user comprises determining, based on the comparison, that the at least one biometric input of the user of the display device is indicative of the at least one biometric pattern of the registered user.

28. The display device of claim 25, the operation further comprising obtaining third information associated with an environment of the user of the display device, wherein the determination at the first point in time of whether the user of the display device is the registered user is based on the first information, the second information, and the third information.

29. The display device of claim 28, wherein the third information comprises one or more communication signals obtained by the display device from at least one computing device in the environment, the at least one computing device being associated with the registered user of the display device.

30. The display device of claim 25, the operation further comprising generating the second information that is indicative of the at least one biometric input based on the first information.

31. The display device of claim 25, wherein the at least one biometric input comprises at least one of: (i) a sleeping pattern of the user of the display device, (ii) a gait of the user of the display device, (iii) an eating pattern of the user of the display device, (iv) a speech pattern of the user of the display device, (v) a temperature pattern of the user of the display device, (vi) a pattern of interaction of the user with the display device, or (vii) a vibration pattern of the user of the display device.

32. The display device of claim 22, the operation further comprising, upon determining that the authentication at the first point in time is not successful, authenticating the identity of the user of the display device at a second point in time subsequent to the first point in time and based on the first information.

33. A system comprising:
an analyte sensor system configured to transmit analyte sensor data; and
a display device configured to:
  obtain first information comprising the analyte sensor data transmitted from the analyte sensor system;
  authenticate an identity of a user of the analyte sensor system at a first point in time and based on the first information;
  based on authenticating the identity of the user, receive and display at least a first portion of the first information on the display device;
  perform a second authentication of the user at a subsequent time after the first point in time using at least a second portion of the first information including one or more analyte sensor data; and
  display updated analyte sensor data included in the first information upon the second authentication of the user.

34. The system of claim 33, wherein, in order to authenticate the identity of the user of the display device, the display device is configured to determine, at the first point in time and based on the first information, whether the user of the display device is a registered user of the display device.

35. The system of claim 34, wherein, in order to determine whether the user of the display device is the registered user, the display device is configured to determine that the user of the display device is the registered user when the analyte sensor data has been obtained within a predetermined period of time prior to the first point in time.

36. The system of claim 34, wherein the display device is further configured to obtain second information associated with the user of the display device, the second information being indicative of at least one biometric input of the user of the display device, wherein the determination at the first point in time of whether the user of the display device is the registered user is based on the first information and the second information.

* * * * *